(12) United States Patent
Kaneko

(10) Patent No.: US 11,597,807 B2
(45) Date of Patent: Mar. 7, 2023

(54) NORMAL TEMPERATURE-CURABLE HARD COAT COMPOSITION

(71) Applicant: SHIN-ETSU CHEMICAL CO., LTD., Tokyo (JP)

(72) Inventor: Tatsuro Kaneko, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/729,394

(22) Filed: Apr. 26, 2022

(65) Prior Publication Data

US 2022/0363851 A1    Nov. 17, 2022

(30) Foreign Application Priority Data

May 7, 2021   (JP) .............................. JP2021-078996

(51) Int. Cl.
     *C08J 7/046*      (2020.01)
     *C08G 77/54*      (2006.01)
     *C08K 5/544*      (2006.01)
     *C08K 5/5419*      (2006.01)
     *C08G 77/08*      (2006.01)

(52) U.S. Cl.
     CPC .............. *C08J 7/046* (2020.01); *C08G 77/08* (2013.01); *C08G 77/54* (2013.01); *C08K 5/544* (2013.01); *C08K 5/5419* (2013.01)

(58) Field of Classification Search
     CPC .......... C08J 7/046; C08G 77/08; C08G 77/54; C08K 5/5419; C08K 5/544
     See application file for complete search history.

(56) References Cited

U.S. PATENT DOCUMENTS

| 2016/0017230 A1* | 1/2016 | Marrwitz | C09D 183/14 |
| | | | 524/188 |
| 2016/0208152 A1* | 7/2016 | Araki | C08L 83/04 |
| 2019/0119506 A1* | 4/2019 | Kim | B32B 27/283 |

FOREIGN PATENT DOCUMENTS

| JP | 2000-071380 A | 3/2000 |
| JP | 2002-053688 A | 2/2002 |
| JP | 2012-007119 A | 1/2012 |
| JP | 2013-170209 A | 9/2013 |
| JP | 2015-066886 A | 4/2015 |
| WO | 2017/115819 A1 | 7/2017 |

\* cited by examiner

*Primary Examiner* — Michael B Nelson
(74) *Attorney, Agent, or Firm* — Oliff PLC

(57) ABSTRACT

The present invention is a normal temperature-curable hard coat composition containing at least (A) a polysilazane compound having structures shown by the following formula (1) and (B) an alkoxysilane compound. The ratio of [a] the number of Si—H bonds in the polysilazane compound and [b] the number of alkoxy groups in the alkoxysilane compound is in a range of [b]/[a]=1.5 to 3. The present invention provides the normal temperature-curable hard coat composition which has excellent workability on outdoors, cures at normal temperature, improves surface hardness of plastic materials, and is used as an alternative material to glass.

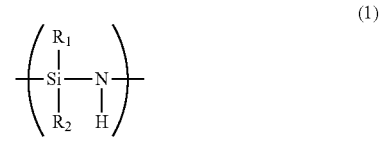

(1)

16 Claims, No Drawings

NORMAL TEMPERATURE-CURABLE HARD COAT COMPOSITION

TECHNICAL FIELD

The present invention relates to a normal temperature-curable hard coat composition.

BACKGROUND ART

Plastics represented by polycarbonates, acrylic resins, etc. are superior to glass in toughness, light-weight characteristic, and moldability. Thus, effort to substitute glass materials with plastic materials is prominent in each field. Because glass has good transmittance of visible light, it is widely used as a material for house windows etc. in order to see opposite side view. However, it is widely known that while glass has an advantage in scratch resistance because of its hardness, it breaks by strong impact because of its fragileness and broken pieces scatter in some case, causing serious injuries. To overcome the disadvantage, shatter proof glass etc. with a structure in which a scattering prevention film is inserted between glasses are also widely known. However, scattering prevention glass only has an advantage of less glass scatters, and breaks due to impact are not alleviated. In addition, because glass has quite high molding temperature and inferior processability to plastics, it requires quite high molding costs for elaborated design processing. Therefore, there also arises a problem that inexpensive mass-production of general-purpose items is difficult.

On the other hand, plastic materials, such as polycarbonates or acrylic resins, which have been widely adopted as alternative materials to glass, have an advantages in the above points compared to glass. However, plastic materials have serious practical disadvantage compared to glass because of their low surface hardness and easiness to get scratches. For example, plastic materials are easily scratched by flying stones from vehicles in outdoor use, and by nail when people directly touch the plastics.

To solve the problem, a technique has been used in which the surface of plastic materials is covered with a firm hard coat layer so as to increase surface hardness and resistance to scratch. Such transparent hard coats to be used as an alternative material to glass have a number of reports. For example, it is reported that a hard coat layer made of epoxy based silane, acrylic based silane or alkoxysilane mixed with silica fine particles is used as a top coat (for example, Patent Document 1). However, this method always requires heat curing step, and constructions on outdoor etc. are difficult and not realistic. In addition, a method using scaly metal oxide fine particles for a top coat (for example, Patent Document 2) has been reported. However, this method has difficulty in coating on outdoors because of an irradiating step for curing with energy rays, such as microwave etc, and a problem of insufficient hardness after curing.

To improve hardness, a method for forming dense silica as a top coat layer by CVD has also been reported (for example, Patent Document 3). However, formation of the silica film by CVD is less productive and not realistic for use of coating on outdoors because it is batch production or requires a high temperature of several hundred ° C.

Further, as a technique for forming a coating film with high hardness, there is a method in which polysilazane is hydrolyzed and turned to glass. Perhydropolysilazane, which turns to silica glass completely after curing, has sufficiently high coating film hardness, and can be cured even at normal temperature by adding a curing catalyst (for example, Patent Documents 4 to 6). However, because of large volume shrinkage at curing (curing shrinkage), when perhydropolysilazane is applied in a manner of avoiding crack occurrence, the resulting film has a thickness of approximately 1 μm or less. When the substrate has high hardness, perhydropolysilazane does not cause problems. However, when perhydropolysilazane is applied onto relatively soft materials, such as plastic materials, the materials sink due to curing shrinkage, causing a problem that the coating film cannot exhibit the original hardness. To solve the problem, organic polysilazane in which organic groups, such as a methyl group, are introduced is used to reduce curing shrinkage. Thus, in accordance with the introduced amount of the organic groups, the maximum film thickness considerably improves. In addition, the increase in the film thickness enables reduction of the substrate depression. However, polysilazane in which organic groups are introduced is stable compared to perhydropolysilazane, and curing at normal temperature is difficult even if a curing catalyst is added. Although curing at relatively low temperature is possible by adding an amine compound in the organic polysilazane structure, the polysilazane has insufficient hardness and low effect as a hard coat on plastics, such as polycarbonate.

Accordingly, in order to solve the above problems, for coating on outdoors, it is required to develop a normal temperature-curable hard coat composition which is cured around normal temperature, has excellent visible light transmittance like glass, and exhibits sufficient hardness after curing in outdoor use of plastic materials.

CITATION LIST

Patent Literature

Patent Document 1: JP 2015-066886 A
Patent Document 2: JP 2013-170209 A
Patent Document 3: WO 2017/115819 A1
Patent Document 4: JP 2012-007119 A
Patent Document 5: JP 2002-053688 A
Patent Document 6: JP 2000-071380 A

SUMMARY OF INVENTION

Technical Problem

The present invention has been made in view of the above circumstances, and an object thereof is to provide a normal temperature-curable hard coat composition used as an alternative material to glass, the composition being excellent in workability on outdoors, curable at normal temperature, and capable of improving surface hardness of plastic materials.

Solution to Problem

In order to achieve the above object, the present invention provides a normal temperature-curable hard coat composition comprising at least:

(A) a polysilazane compound having structures shown by the following formula (1)

wherein R₁ represents a hydrogen atom, or a group selected from an aliphatic hydrocarbon group having 1 to 6 carbon atoms, an aromatic hydrocarbon group having 6 to 12 carbon atoms, and an alkoxy group having 1 to 6 carbon atoms, each R₁ is identical to or different from one another,
the polysilazane compound contains at least one Si—H bond in one molecule,
R₂ represents a group selected from an aliphatic hydrocarbon group having 1 to 6 carbon atoms, an aromatic hydrocarbon group having 6 to 12 carbon atoms, and an alkoxy group having 1 to 6 carbon atoms, and
each R₂ is identical to or different from one another; and
(B) an alkoxysilane compound,
wherein a ratio of [a] the number of Si—H bonds in the polysilazane compound and [b] the number of alkoxy groups in the alkoxysilane compound is in a range of [b]/[a]=1.5 to 3.

Such a normal temperature-curable hard coat composition has excellent workability on outdoors, cures at normal temperature, improves surface hardness of plastic materials, and is used as an alternative material to glass.

Further, in the inventive normal temperature-curable hard coat composition, the polysilazane compound is preferably a methyl polysilazane.

Such a normal temperature-curable hard coat composition is preferable because the dehydrogenation reaction rate is appropriate, and the curing rate is appropriate.

Moreover, in the inventive normal temperature-curable hard coat composition, an alkoxy group of the alkoxysilane compound is preferably a methoxy group.

Such a normal temperature-curable hard coat composition is preferable because the hydrolysis rate of the alkoxy group is appropriate, and the curing rate is more appropriate.

Further, in the inventive normal temperature-curable hard coat composition, the alkoxysilane compound is preferably aminopropyltrimethoxysilane.

Such a normal temperature-curable hard coat composition is preferable because the transparency of the coating film after curing and the curing rate are further appropriate.

Furthermore, the inventive normal temperature-curable hard coat composition preferably further comprises a condensation curing catalyst selected from compounds containing a titanium or aluminum atom.

Such a normal temperature-curable hard coat composition is preferable because the dehydration condensation reaction of a hydroxy group is promoted.

Advantageous Effects of Invention

As described above, the inventive normal temperature-curable hard coat composition is cured at normal temperature, and enables sufficient improvement of surface hardness of plastic materials. It is possible to obtain a normal temperature-curable hard coat composition which has excellent workability on outdoors, improves surface hardness of plastic materials, and is used as an alternative material to glass.

Description of Embodiments

As noted above, it is demanded to develop a normal temperature-curable hard coat composition which has excellent workability on outdoors, cures at normal temperature, improves surface hardness of plastic materials, and is used as an alternative material to glass.

As a result of intensive studies on the above problems, the present inventor has found that a normal temperature-curable hard coat composition containing at least (A) a polysilazane compound with structures shown by a formula (1) described below, and (B) an alkoxysilane compound, and having a ratio of [a] the number of Si—H bonds in the polysilazane compound and [b] the number of alkoxy groups in the alkoxysilane compound ([b]/[a]) in a range of 1.5 to 3, has excellent workability on outdoors, cures at normal temperature, improves surface hardness of plastic materials, and is used as an alternative material to glass. These findings have led to the completion of the present invention.

Specifically, the present invention is a normal temperature-curable hard coat composition comprising at least:

(A) a polysilazane compound having structures shown by the following formula (1)

wherein R₁ represents a hydrogen atom, or a group selected from an aliphatic hydrocarbon group having 1 to 6 carbon atoms, an aromatic hydrocarbon group having 6 to 12 carbon atoms, and an alkoxy group having 1 to 6 carbon atoms, each R₁ is identical to or different from one another,
the polysilazane compound contains at least one Si—H bond in one molecule,
R₂ represents a group selected from an aliphatic hydrocarbon group having 1 to 6 carbon atoms, an aromatic hydrocarbon group having 6 to 12 carbon atoms, and an alkoxy group having 1 to 6 carbon atoms, and
each R₂ is identical to or different from one another; and
(B) an alkoxysilane compound,
wherein a ratio of [a] the number of Si—H bonds in the polysilazane compound and [b] the number of alkoxy groups in the alkoxysilane compound is in a range of [b]/[a]=1.5 to 3.

Hereinafter, the present invention will be described in detail, but the present invention is not limited to these.

The inventive normal temperature-curable hard coat composition contains at least (A) a polysilazane compound having structures shown by the following formula (1), and (B) an alkoxysilane compound, such that a ratio of [a] the number of Si—H bonds in the polysilazane compound and [b] the number of alkoxy groups in the alkoxysilane compound ([b]/[a]) is in a range of 1.5 to 3. Hereinafter each component will be described. In addition, normal temperature means that the temperature condition is in the range of 5 to 35° C. as described in JIS Z 8703:1993.

In the formula, R₁ represents a hydrogen atom, or a group selected from an aliphatic hydrocarbon group having 1 to 6 carbon atoms, an aromatic hydrocarbon group having 6 to 12 carbon atoms, and an alkoxy group having 1 to 6 carbon atoms. Each Ri is identical to or different from one another. The polysilazane compound contains at least one Si—H bond in one molecule. Moreover, R₂ represents a group selected from an aliphatic hydrocarbon group having 1 to 6 carbon atoms, an aromatic hydrocarbon group having 6 to 12 carbon atoms, and an alkoxy group having 1 to 6 carbon atoms. Each $R_2$ is identical to or different from one another.

[Component (A): Polysilazane Compound]

The polysilazane compound of the present invention is a polysilazane having structures shown by the following formula (1).

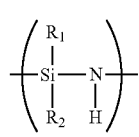

$R_1$ in the formula (1) is a hydrogen atom, or a group selected from an aliphatic hydrocarbon group having 1 to 6 carbon atoms, an aromatic hydrocarbon group having 6 to 12 carbon atoms, and an alkoxy group having 1 to 6 carbon atoms. Each $R_1$ is identical to or different from one another. The polysilazane compound contains at least one Si—H bond per molecule. Moreover, $R_2$ is a group selected from an aliphatic hydrocarbon group having 1 to 6 carbon atoms, an aromatic hydrocarbon group having 6 to 12 carbon atoms, and an alkoxy group having 1 to 6 carbon atoms. Each $R_2$ is identical to or different from one another. If the Si—H bond does not exist in any molecule, the polysilazane cannot be a firm film after curing, and usage as a normal temperature-curable hard coat composition is difficult.

The Si—H bond in the structure is relatively stable, and is poor in reactivity compared to perhydropolysilazane in which all $R_1$'s and $R_2$'s are hydrogen groups. Perhydropolysilazane will easily undergo dehydrogenation reaction even at normal temperature, and when dehydrogenation catalyst is added, the reaction proceeds in a shorter time. However, if a Si atom bonded with a hydrogen atom contains an organic group, such as a methyl group or an ethyl group, the perhydropolysilazane becomes stable, and the dehydrogenation reaction hardly proceeds at normal temperature. Thus, various studies have been conducted on a method by which the dehydrogenation reaction of organic polysilazane proceeds at normal temperature. As a result, the inventor has found a method in which an alkoxysilane compound is added. In this event, for the efficient dehydrogenation reaction from an Si—H bond, the amount of alkoxy groups is important, and the ratio of [a] the number of Si—H bonds in the polysilazane compound and [b] the number of alkoxy groups in the alkoxysilane compound (ratio of [b] to [a]; [b]/[a]) should be in a range of 1.5 to 3. When the ratio is less than 1.5, the dehydrogenation reaction of the Si—H does not sufficiently proceed. Moreover, when the ratio is above 3, the hardness of the coating film after curing cannot be sufficiently kept at high value. Preferable range of [b]/[a] is 1.7 to 2.5.

The polysilazane compound is not particularly limited, as long as $R_1$ and $R_2$ are as above. In view of the dehydrogenation reaction rate at normal temperature, the polysilazane compound is preferably a methyl polysilazane.

[Component (B): Alkoxysilane Compound]

The alkoxysilane compound to be used in the present invention is not particularly limited, as long as it is a silane compound having an alkoxy group. The alkoxy moiety hydrolyzes at normal temperature to be a hydroxy group. The hydroxy group and the Si—H bond of the polysilazane react, and this makes curing at normal temperature possible.

An alkoxysilane compound containing a hydroxy group in a molecule in advance can be contained, but when the amount is too much, such alkoxysilane compound reacts with the polysilazane at mixing. Therefore, the alkoxysilane compound containing the hydroxy group in a molecule in advance is preferably little, and more preferably, is zero.

Incidentally, the type of the alkoxy group is not particularly limited. Since the hydrolysis rate decreases generally in the order of a methoxy group, an ethoxy group, and a propoxy group, an appropriate alkoxy group is preferably selected from the viewpoint of the curing rate. Specific examples thereof include vinyltrimethoxysilane, vinyltriethoxysilane, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, tris-(trimethoxysilylpropyl)isocyanurate, 3-ureidopropyltrialkoxysilane, 3-mercaptopropylmethyldimethoxysilane, 3-mercaptopropyltrimethoxysilane, 3-isocyanatepropyltriethoxysilane, etc.

Among these, aminopropyltrimethoxysilane and aminopropyltriethoxysilane are preferable from the viewpoints of reactivity with polysilazane, transparency of coating film after curing, etc. Further, in view of the curing rate, aminopropyltrimethoxysilane is more preferable.

[Condensation Curing Catalyst]

The inventive normal temperature-curable hard coat composition cures at normal temperature even when heat treatment etc. cannot be applied under outdoor environments, for example. Nevertheless, a condensation curing catalyst can be added in order to shorten curing time. The condensation curing catalyst is not particularly limited, as long as it promotes the dehydration condensation reaction of the hydroxy group. The composition more preferably contains a condensation curing catalyst selected from compounds containing a titanium or aluminum atom.

Specific examples thereof include metal compounds, such as triethoxyaluminum, tributoxyaluminum, dibutoxy(2-oxo-5-oxa-3-heptene-4-yloxy)aluminum, di(ethylacetoacetate) monobutoxyaluminum, ethyl acetoacetate di(isopropoxy) aluminum, aluminum trichloride, tetraethoxytitanium, tetraisopropoxytitanium, tetrabutoxytitanium, tetra(2-ethylhexoxide)titanium, titanium tetrachloride, tetrakis(2,4-pentanedionato)titanium, diisopropoxybis(ethylacetoacetate)titanium, zinc chloride, and zinc acetate; inorganic acids, such as hydrochloric acid, nitric acid, and sulfuric acid; organic acids, such as formic acid, acetic acid, propionic acid, citric acid, and oxalic acid; inorganic bases, such as lithium hydroxide, sodium hydroxide, and potassium hydroxide; organic bases, such as pyridine and triethyl amine; etc. Among these, dibutoxy(2-oxo-5-oxa-3-heptene-4-yloxy) aluminum and di(ethylacetoacetate)monobutyrate aluminum are especially preferable because curing rate is appropriate, and colorless and transparent coating film in visible light range is obtained after curing.

If the curing rate is too slow, the materials have to be left standing for a long time until hardness becomes sufficiently high. Moreover, if the curing rate is too fast, leaving component, such as alcohol, generated at curing, cannot easily evaporate from the coating film, and voids are generated. For the appropriate curing rate, the addition amount of the condensation curing catalyst can be adjusted. The addition amount of the condensation curing catalyst differs according to the type of alkoxysilane or polysilazane to be used, but the condensation curing catalyst is preferably added in an amount of 0.001 to 0.5 parts by mass relative to 100 parts by mass of the total of the polysilazane compound and the alkoxysilane compound. In this range, both the curing rate and the appearance of the coating film are excellent.

As mentioned above, the progress of the dehydrogenation reaction is adjusted by the selection of $R_1$ and $R_2$ of the component (A). The hydrolysis rate is adjusted by the selection of the alkoxy group of the component (B). The dehydration condensation reaction is appropriately promoted by the selection of the condensation curing catalyst as a component (C). By appropriately combining the components (A) and (B), and component (C) as necessary, the present invention provides a normal temperature-curable hard coat composition which undergoes curing reaction in a controlled manner to have excellent workability on outdoors, cures at normal temperature, improves surface hardness of plastic materials and is used as an alternative material to glass.

[Additives]

Solvents, fillers, etc. can be added to the inventive normal temperature-curable hard coat composition used in the present invention as necessary. The additives are not particularly limited, as long as the resulting coating film becomes transparent and these additives are compatible with the polysilazane compound and the alkoxysilane compound to be employed. Examples of the fillers include reinforcing inorganic fillers such as fumed silica, fumed titanium dioxide, and fumed alumina; non-reinforcing inorganic fillers and ultraviolet reflectors, such as fused silica, alumina, zirconium oxide, calcium carbonate, calcium silicate, titanium dioxide, ferric oxide, and zinc oxide; ultraviolet absorbers, such as benzophenone type, benzotriazole type and triazine type; adhesive aids including organosiloxane oligomer containing at least two, preferably two or three kinds of functional groups selected from an alkenyl group, an alkoxysilyl group and an epoxy group, organooxysilyl-modified isocyanurate compounds and hydrolysis condensates thereof; and silicone oils, such as dimethylsilicone and phenylsilicone. Examples of the solvents (diluent solvent) include alkene compounds, such as 1-octene, 1-nonene, 1-decene, 1-dodecene and β-myrcene; cycloalkane compounds, such as cyclohexane, methylcyclohexane and dimethylcyclohexane; cycloalkene compounds, such as cyclohexene; terpene compounds, such as p-menthane, d-limonene, 1-limonene and dipentene; ester compounds, such as n-propyl acetate, isopropyl acetate, n-butyl acetate, isobutyl acetate, isoamyl acetate, ethyl acetoacetate and ethyl caproate; alkyl ether compounds, such as diethyl ether and dibutyl ether; glycol ether compounds, such as bis(2-methoxyethyl)ether, bis(2-ethoxyethyl)ether and bis(2-butoxyethyl)ether; etc. These may be added at an arbitrary ratio.

[Method for Forming Coating Film]

The inventive normal temperature-curable hard coat composition can be used directly as a coating composition. Examples of the method for applying the normal temperature-curable hard coat composition include a roll coating method using a chamber doctor coater, a single roll kiss coater, a reverse kiss coater, a bar coater, a reverse roll coater, a forward rotation roll coater, a blade coater, a knife coater, etc; a spin coating method; a dispensing method; a dip method; a spray method; a transfer method; a slit coat method; etc. In addition, in a case where the above application methods cannot be used, it is possible to use a wipe coating method in which a certain cloth, paper, etc. is soaked into the normal temperature-curable hard coat composition and applied to a substrate with hand.

Examples of the substrate to be coated include silicon substrates, glass substrates, metal substrates, resin substrates, resin films, etc. The material is not particularly limited, as long as the surface protection of the substrate is needed. The thickness of the coating film varies depending on the purpose of use of the substrate, and so forth, but the cured film has a thickness of generally 0.1 to 100 μm, preferably 10 to 50 μm. In the present invention, since the volume shrinkage (curing shrinkage) at curing is small, increase in the film thickness is possible.

After forming the coating film by applying the normal temperature-curable hard coat composition in this way, it is preferable to leave the coating film standing for curing the coating film. The purpose of this step is to promote removal of the solvent contained in the coating film and curing reaction, such as hydrolysis, dehydration condensation, dehydrocondensation, and deammoniation condensation of the polysilazane compound and the alkoxysilane compound.

This standing step may be carried out at room temperature (25° C.) or heating may be performed if possible. The heating is preferably performed at 50 to 150° C. The time for performing the standing step is optimized as appropriate depending on conditions, such as temperature and humidity, but it is desirable to leave the coating film standing at least until it reaches the set-to-touch state.

The "set-to-touch state" refers to a state in which a fingertip is not soiled by lightly touching the center of the coated surface with the fingertip, as described in JIS 5600-1-1:1999. As a guideline, it is preferable to reach the set-to-touch state at 23° C. and 50% RH within 1 hour; more preferably, complete curing is achieved within 24 hours under these conditions. The set-to-touch state under such conditions can make the workability on outdoors excellent, which is preferable.

EXAMPLE

Hereinafter, the present invention will be specifically described by showing Examples and Comparative Examples, but this invention is not limited to the following Examples. Incidentally, in the following examples, part(s) represent part(s) by mass. In addition, normal temperature means that the temperature condition is in the range of 5 to 35° C. as described in JIS Z 8703:1993.

The following evaluations were carried out on each composition obtained in Examples 1 to 6 and Comparative Examples 1 to 7.

[Appearance]

The appearance of each coating film was visually evaluated.

[Pencil Hardness]

The pencil hardness was measured using a pencil hardness tester (manufactured by Pepaless Co., Ltd.) under a load of 750 g according to JIS K 5600-5-4:1999.

Example 1

50 parts of methyl polysilazane as the polysilazane compound, 100 parts of aminopropyltrimethoxysilane as the alkoxysilane compound, and 0.15 parts of dibutoxy(2-oxo-5-oxa-3-heptene-4-yloxy)aluminum (Chelope EB-2, manufactured by Hope Chemical Co., LTD) as the condensation curing catalyst were mixed to obtain a normal temperature-curable hard coat composition A. The normal temperature-curable hard coat composition A was applied to a polycarbonate plate having a thickness of 2 mm such that the composition had a thickness of 50 μm thereon, and left standing at 25° C. (normal temperature) and 40% RH for 12 hours. After that, the appearance of the coating film was found colorless and transparent. Further, the pencil hardness measured on the coating film was 8H.

Example 2

50 parts of methyl polysilazane as the polysilazane compound, 125 parts of aminopropyltriethoxysilane as the alkoxysilane compound, and 0.15 parts of dibutoxy(2-oxo-5-oxa-3-heptene-4-yloxy)aluminum (Chelope EB-2, manufactured by Hope Chemical Co., LTD) as the condensation curing catalyst were mixed to obtain a normal temperature-curable hard coat composition B. The normal temperature-curable hard coat composition B was applied to a polycarbonate plate having a thickness of 2 mm such that the composition had a thickness of 50 μm thereon, and left standing at 25° C. (normal temperature) and 40% RH for 12 hours. After that, the appearance of the coating film was found colorless and transparent. Further, the pencil hardness measured on the coating film was 8H.

Example 3

50 parts of methyl polysilazane as the polysilazane compound, 75 parts of aminopropyltrimethoxysilane as the alkoxysilane compound, and 0.13 parts of dibutoxy(2-oxo-5-oxa-3-heptene-4-yloxy)aluminum (Chelope EB-2, manufactured by Hope Chemical Co., LTD) as the condensation curing catalyst were mixed to obtain a normal temperature-curable hard coat composition C. The normal temperature-curable hard coat composition C was applied to a polycarbonate plate having a thickness of 2 mm such that the composition had a thickness of 50 μm thereon, and left standing at 25° C. (normal temperature) and 40% RH for 12 hours. After that, the appearance of the coating film was found colorless and transparent. Further, the pencil hardness measured on the coating film was 8H.

Example 4

50 parts of methyl polysilazane as the polysilazane compound, 150 parts of aminopropyltrimethoxysilane as the alkoxysilane compound, and 0.2 parts of dibutoxy(2-oxo-5-oxa-3-heptene-4-yloxy)aluminum (Chelope EB-2, manufactured by Hope Chemical Co., LTD) as the condensation curing catalyst were mixed to obtain a normal temperature-curable hard coat composition D. The normal temperature-curable hard coat composition D was applied to a polycarbonate plate having a thickness of 2 mm such that the composition had a thickness of 50 μm thereon, and left standing at 25° C. (normal temperature) and 40% RH for 12 hours. After that, the appearance of the coating film was found colorless and transparent. Further, the pencil hardness measured on the coating film was 8H.

Example 5

50 parts of methyl/dimethyl polysilazane copolymer (co-polymerization ratio 50:50) as the polysilazane compound, 50 parts of aminopropyltrimethoxysilane as the alkoxysilane compound, and 0.07 parts of dibutoxy(2-oxo-5-oxa-3-heptene-4-yloxy)aluminum (Chelope EB-2, manufactured by Hope Chemical Co., LTD) as the condensation curing catalyst were mixed to obtain a normal temperature-curable hard coat composition E. The normal temperature-curable hard coat composition E was applied to a polycarbonate plate having a thickness of 2 mm such that the composition had a thickness of 50 μm thereon, and left standing at 25° C. (normal temperature) and 40% RH for 12 hours. After that, the appearance of the coating film was found colorless and transparent. Further, the pencil hardness measured on the coating film was 8H.

Example 6

50 parts of methyl polysilazane as the polysilazane compound and 100 parts of aminopropyltrimethoxysilane as the alkoxysilane compound were mixed without adding the condensation curing catalyst to obtain a normal temperature-curable hard coat composition F. The normal temperature-curable hard coat composition F was applied to a polycarbonate plate having a thickness of 2 mm such that the composition had a thickness of 50 μm thereon, and left standing at 25° C. (normal temperature) and 40% RH for 12 hours. After that, the appearance of the coating film was found colorless and transparent. Further, the pencil hardness measured on the coating film was 6H.

Comparative Example 1

50 parts of methyl polysilazane as the polysilazane compound, 100 parts of aminopropyltrimethylsilane, and 0.15 parts of dibutoxy(2-oxo-5-oxa-3-heptene-4-yloxy)aluminum (Chelope EB-2, manufactured by Hope Chemical Co., LTD) as the condensation curing catalyst were mixed to obtain a normal temperature-curable hard coat composition G. The normal temperature-curable hard coat composition G was applied to a polycarbonate plate having a thickness of 2 mm such that the composition had a thickness of 50 μm thereon, and left standing at 25° C. (normal temperature) and 40% RH for 12 hours. After that, the appearance of the coating film was found colorless and transparent, but the coating film did not cure.

Comparative Example 2

50 parts of methyl polysilazane as the polysilazane compound, 50 parts of aminopropyltrimethoxysilane as the alkoxysilane compound, and 0.1 parts of dibutoxy(2-oxo-5-oxa-3-heptene-4-yloxy)aluminum (Chelope EB-2, manufactured by Hope Chemical Co., LTD) as the condensation curing catalyst were mixed to obtain a normal temperature-curable hard coat composition H. The normal temperature-curable hard coat composition H was applied to a polycarbonate plate having a thickness of 2 mm such that the composition had a thickness of 50 μm thereon, and left standing at 25° C. (normal temperature) and 40% RH for 12 hours. After that, the appearance of the coating film was found colorless and transparent. In addition, the pencil hardness measured on the coating film was H.

Comparative Example 3

50 parts of methyl polysilazane as the polysilazane compound, 200 parts of aminopropyltrimethoxysilane as the alkoxysilane compound, and 0.25 parts of dibutoxy(2-oxo- 5-oxa-3-heptene-4-yloxy)aluminum (Chelope EB-2, manufactured by Hope Chemical Co., LTD) as the condensation curing catalyst were mixed to obtain a normal temperature-curable hard coat composition I. The normal temperature-curable hard coat composition I was applied to a polycarbonate plate having a thickness of 2 mm such that the composition had a thickness of 50 μm thereon, and left standing at 25° C. (normal temperature) and 40% RH for 12 hours. After that, the appearance of the coating film was found cloudy, and the film was uneven depending on locations. In addition, the pencil hardness measured on the coating film was 2H.

Comparative Example 4

50 parts of perhydropolysilazane, 200 parts of aminopropyltrimethoxysilane as the alkoxysilane compound, and 0.25 parts of dibutoxy(2-oxo-5-oxa-3-heptene-4-yloxy)aluminum (Chelope EB-2, manufactured by Hope Chemical Co., LTD) as the condensation curing catalyst were mixed to obtain a normal temperature-curable hard coat composition J. The normal temperature-curable hard coat composition J was applied to a polycarbonate plate having a thickness of 2 mm such that the composition had a thickness of 50 μm thereon, and left standing at 25° C. (normal temperature) and 40% RH for 12 hours. After that, the appearance of the coating film was found cloudy. In addition, the pencil hardness measured on the coating film was H.

Comparative Example 5

50 parts of dimethyl polysilazane as the polysilazane compound, 100 parts of aminopropyltrimethoxysilane as the alkoxysilane compound, and 0.15 parts of dibutoxy(2-oxo-5-oxa-3-heptene-4-yloxy)aluminum (Chelope EB-2, manufactured by Hope Chemical Co., LTD) as the condensation curing catalyst were mixed to obtain a normal temperature-curable hard coat composition K. The normal temperature-curable hard coat composition K was applied to a polycarbonate plate having a thickness of 2 mm such that the composition had a thickness of 50 μm thereon, and left standing at 25° C. (normal temperature) and 40% RH for 12 hours. After that, the appearance of the coating film was found colorless and transparent, but the coating film did not cure.

Comparative Example 6

50 parts of dimethyl polysilazane as the polysilazane compound and 0.15 parts of dibutoxy(2-oxo-5-oxa-3-heptene-4-yloxy)aluminum (Chelope EB-2, manufactured by Hope Chemical Co., LTD) as the condensation curing catalyst were mixed to obtain a normal temperature-curable hard coat composition L. The normal temperature-curable hard coat composition L was applied to a polycarbonate plate having a thickness of 2 mm such that the composition had a thickness of 50 μm thereon, and left standing at 25° C. (normal temperature) and 40% RH for 12 hours. After that, the appearance of the coating film was found colorless and transparent, but the coating film did not cure.

Comparative Example 7

100 parts of aminopropyltrimethoxysilane as the alkoxysilane compound and 0.15 parts of dibutoxy(2-oxo-5-oxa-3-heptene-4-yloxy)aluminum (Chelope EB-2, manufactured by Hope Chemical Co., LTD) as the condensation curing catalyst were mixed to obtain a normal temperature-curable hard coat composition M. The normal temperature-curable hard coat composition M was applied to a polycarbonate plate having a thickness of 2 mm such that the composition had a thickness of 50 μm thereon, and left standing at 25° C. (normal temperature) and 40% RH for 12 hours. After that, the appearance of the coating film was found cloudy, and the coating film was peeled off, which hindered the measurement of the pencil hardness.

The results of Examples and Comparative Examples are shown in Table 1.

TABLE 1

| Examples & Comparative Examples | Polysilazane Compound | | Alkoxysilane Compound | | Condensation Curing Catalyst | | Number of alkoxy groups/ Si—H bonds [b]/[a] | After standing for 12 h | |
|---|---|---|---|---|---|---|---|---|---|
| | Type | Addition amount | Type | Addition amount | Type | Addition amount | | Appearance | Pencil Hardness |
| Example 1 | Methyl polysilazane | 50 | Aminopropyl-trimethoxysilane | 100 | Chelope EB-2 | 0.15 | 2.0 | Colorless and transparent | 8H |
| Example 2 | Methyl polysilazane | 50 | Aminopropyl-triethoxysilane | 125 | Chelope EB-2 | 0.15 | 2.5 | Colorless and transparent | 8H |
| Example 3 | Methyl polysilazane | 50 | Aminopropyl-trimethoxysilane | 75 | Chelope EB-2 | 0.13 | 1.5 | Colorless and transparent | 8H |
| Example 4 | Methyl polysilazane | 50 | Aminopropyl-trimethoxysilane | 150 | Chelope EB-2 | 0.2 | 3.0 | Colorless and transparent | 8H |
| Example 5 | Methyl/dimethyl Polysilazane Copolymer (copolymerization ratio 50:50) | 50 | Aminopropyl-trimethoxysilane | 50 | Chelope EB-2 | 0.07 | 1.7 | Colorless and transparent | 8H |
| Example 6 | Methyl polysilazane | 50 | Aminopropyl-trimethoxysilane | 100 | — | — | 2.0 | Colorless and transparent | 6H |

TABLE 1-continued

| Examples & Comparative Examples | Polysilazane Compound Type | Polysilazane Addition amount | Alkoxysilane Compound Type | Alkoxysilane Addition amount | Condensation Curing Catalyst Type | Condensation Curing Catalyst Addition amount | Number of alkoxy groups/Si—H bonds [b]/[a] | After standing for 12 h Appearance | After standing for 12 h Pencil Hardness |
|---|---|---|---|---|---|---|---|---|---|
| Comparative Example 1 | Methyl polysilazane | 50 | Aminopropyl-trimethyl-silane | 100 | Chelope EB-2 | 0.15 | — | Colorless and transparent | n/a |
| Comparative Example 2 | Methyl polysilazane | 50 | Aminopropyl-trimethoxy-silane | 50 | Chelope EB-2 | 0.1 | 1.0 | Colorless and transparent | H |
| Comparative Example 3 | Methyl polysilazane | 50 | Aminopropyl-trimethoxy-silane | 200 | Chelope EB-2 | 0.25 | 4.0 | Cloudy | 2H |
| Comparative Example 4 | Perhydropoly silazane | 50 | Aminopropyl-trimethoxy-silane | 200 | Chelope EB-2 | 0.25 | 1.5 | Cloudy | H |
| Comparative Example 5 | Dimethyl polysilazane | 50 | Aminopropyl-trimethoxy-silane | 100 | Chelope EB-2 | 0.15 | — | Colorless and transparent | n/a |
| Comparative Example 6 | Methyl polysilazane | 50 | — | — | Chelope EB-2 | 0.15 | — | Colorless and transparent | n/a |
| Comparative Example 7 | — | — | Aminopropyl-trimethoxy-silane | 100 | Chelope EB-2 | 0.15 | — | Cloudy | n/a |

From the results of Table 1, in Examples 1 to 6 and Comparative Examples 1, 2, 5, 6, the appearance of the coating films was colorless and transparent after being left standing at normal temperature for 12 hours. However, in Comparative Examples 1, 5, and 6, the coating films did not cure, and finger marks were left on the touched coating films. Further, in Comparative Examples 3, 4, and 7, the appearance of the coating films was cloudy. The cause of the cloudiness is presumably as follows: in Comparative Examples 3 and 7, since the amount of the alkoxy groups is too large, self-condensation of the alkoxy groups themselves occurs; the molecules three-dimensionally grow; and uniformity of the coating films lowers. These cause the cloudiness. In contrast, in Comparative Example 4, since perhydropolysilazane without hydrocarbon groups has the too fast dehydrogenation reaction, the non-uniform coating film is presumably made.

Next, the pencil hardness in Examples 1 to 5 was 8H, and that in Example 6 was 6H. The film of Example 6 without film condensation curing catalyst cured at normal temperature as well, and exhibited sufficient hardness. Since the pencil hardness of the polycarbonate plate used as the substrate was 2B, it was confirmed that the application of the inventive normal temperature-curable hard coat compositions dramatically improved the surface hardness at normal temperature.

On the other hand, the pencil hardness was H in Comparative Examples 2 and 4 and 2H in Comparative Example 3. Slight improvement of the pencil hardness was observed, but the surface hardness was insufficient depending on the usage environment. Further, the appearance of the coating films in Comparative Examples 3 and 4 was cloudy, and the coating films cannot be used for transparent materials, such as polycarbonate or acrylic. Particularly, the coating films for use as an alternative material to glass exhibits inappropriate appearance. In Comparative Examples 1 and 5 to 7, the coating films were not cured or were peeled off from the substrate. Therefore, the pencil hardness was not evaluated.

From the above results, the normal temperature-curable hard coat compositions obtained in Examples 1 to 6 sufficiently cured at normal temperature in 12 hours, and the coating films had the colorless and transparent appearance. Further, the pencil hardness on the polycarbonate of the coating films was 6H or more.

It should be noted that the present invention is not limited to the above-described embodiments. The embodiments are just examples, and any embodiments that substantially have the same feature and demonstrate the same functions and effects as those in the technical concept disclosed in claims of the present invention are included in the technical scope of the present invention.

The invention claimed is:

1. A normal temperature-curable hard coat composition consisting of:
   (A) a polysilazane compound having structures shown by the following formula (1)

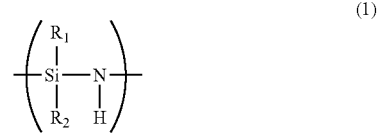

(1)

wherein $R_1$ represents a hydrogen atom, or a group selected from an aliphatic hydrocarbon group having 1 to 6 carbon atoms, an aromatic hydrocarbon group having 6 to 12 carbon atoms, and an alkoxy group having 1 to 6 carbon atoms,
   each $R_1$ is identical to or different from one another,
   the polysilazane compound contains at least one Si—H bond in one molecule,
   $R_2$ represents a group selected from an aliphatic hydrocarbon group having 1 to 6 carbon atoms, an aromatic hydrocarbon group having 6 to 12 carbon atoms, and an alkoxy group having 1 to 6 carbon atoms, and each R₂ is identical to or different from one another;
(B) an alkoxysilane compound; and
optionally, one or more selected from the group consisting of silica fillers, titanium dioxide fillers alumina fillers zirconium oxide fillers calcium carbonate fillers calcium silicate fillers, ferric oxide fillers, zinc oxide fillers, benzophenone ultraviolet absorbers, benzotriazole ultraviolet absorbers, triazine ultraviolet absorbers, organosiloxane oligomers containing at least two kinds of functional groups, organooxysilyl modified isocyanurate compounds and hydrolysis condensates thereof, silicone oils, and solvents;
wherein a ratio of [a] the number of Si-H bonds from the polysilazane compound and [b] the number of alkoxy groups from the alkoxysilane compound is in a range of [b]/[a]=1.5 to 3;
wherein normal temperature is 5 to 35° C.;
wherein the alkoxysilane compound is selected from the group consisting of, 2-(3,4-epoxvcyclohexyl) ethiyltrimethoxysilane, 3-glycidoxypropylmethyldimethoxvsilane, 3-glycidoxypropyltrimethoxysilane, 3-glycidoxypropylmethyldiethoxysilane, 3-glycidoxvpropyltriethoxvsilane, p-styryltrimethoxysilane, N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysily, 1-N-(1,3-dimethylbutylidene)propylamine, N-phenyl-3-aminopropyltrimethoxvsilane, tris(trimethoxysilylpropyl) isocyanurate3-ureidopropyltrialkoxysilane, 3-mercaptopropylmethyldimethoxysilane, 3-mercaptopropyltrimethoxvsilane, and 3-isocyanatepropyltriethoxysilane.

2. The normal temperature-curable hard coat composition according to claim 1, wherein, R₂ is a methyl group.

3. The normal temperature-curable hard coat composition according to claim 1, wherein, an alkoxy group of the alkoxysilane compound is a methoxy group.

4. The normal temperature-curable hard coat composition according to claim 2, wherein, an alkoxy group of the alkoxysilane compound is a methoxy group.

5. The normal temperature-curable hard coat composition according to claim 1, wherein, the alkoxysilane compound is aminopropyltrimethoxysilane.

6. The normal temperature-curable hard coat composition according to claim 2, wherein, the alkoxysilane compound is aminopropyltrimethoxysilane.

7. The normal temperature-curable hard coat composition according to claim 3, wherein, the alkoxysilane compound is aminopropyltrimethoxysilane.

8. The normal temperature-curable hard coat composition according to claim 4, wherein, the alkoxysilane compound is aminopropyltrimethoxysilane.

9. The normal temperature-curable hard coat composition according to claim 1, a wherein the condensation curing catalyst is selected from compounds containing a titanium or aluminum atom.

10. The normal temperature-curable hard coat composition according to claim 2, wherein the condensation curing catalyst selected from compounds containing a titanium or aluminum atom.

11. The normal temperature-curable hard coat composition according to claim 3, wherein the condensation curing catalyst selected from compounds containing a titanium or aluminum atom.

12. The normal temperature-curable hard coat composition according to claim 4, wherein the condensation curing catalyst selected from compounds containing a titanium or aluminum atom.

13. The normal temperature-curable hard coat composition according to claim 5, wherein the condensation curing catalyst selected from compounds containing a titanium or aluminum atom.

14. The normal temperature-curable hard coat composition according to claim 6, wherein the condensation curing catalyst selected from compounds containing a titanium or aluminum atom.

15. The normal temperature-curable hard coat composition according to claim 7, wherein the condensation curing catalyst selected from compounds containing a titanium or aluminum atom.

16. The normal temperature-curable hard coat composition according to claim 8, wherein the condensation curing catalyst selected from compounds containing a titanium or aluminum atom.

* * * * *